United States Patent
Foresi et al.

[11] Patent Number: 6,108,464
[45] Date of Patent: Aug. 22, 2000

[54] OPTOELECTRONIC INTEGRATED CIRCUITS FORMED OF POLYCRYSTALLINE SEMICONDUCTOR WAVEGUIDE

[75] Inventors: James S. Foresi, Brighton; Anu M. Agarwal, Weston, both of Mass.; Marcie R. Black, Austin, Tex.; Debra M. Koker, Vancouver, Wash.; Lionel C. Kimerling, Concord, Mass.

[73] Assignee: Massachusetts Institute of Technology, Cambridge, Mass.

[21] Appl. No.: 09/170,937

[22] Filed: Oct. 13, 1998

[51] Int. Cl.$^7$ ................................ G02B 6/12; G02B 6/10
[52] U.S. Cl. ............................................. 385/14; 385/131
[58] Field of Search ................................. 385/14, 131, 129, 385/130, 132, 147; 257/17, 20, 21, 85, 98, 459; 359/248; 438/180, 39, 571, 969, 71, 97; 427/571, 573, 575

[56] References Cited

U.S. PATENT DOCUMENTS

| | | | |
|---|---|---|---|
| 4,111,725 | 9/1978 | Cho et al. | 438/180 |
| 4,715,672 | 12/1987 | Duguay et al. | 350/96.12 |
| 4,716,559 | 12/1987 | Hine | 369/112 |
| 4,728,167 | 3/1988 | Soref et al. | 350/96.13 |
| 4,781,424 | 11/1988 | Kawachi et al. | 350/96.3 |
| 4,787,691 | 11/1988 | Lorenzo et al. | 350/96.14 |
| 4,789,642 | 12/1988 | Lorenzo et al. | 437/24 |
| 4,862,237 | 8/1989 | Morozumi | 257/72 |
| 4,884,122 | 11/1989 | Eichelberger et al. | 357/71 |
| 4,978,188 | 12/1990 | Kawachi et al. | 350/96.12 |
| 5,035,916 | 7/1991 | Kalnitsky et al. | 427/38 |
| 5,051,788 | 9/1991 | Nicollian et al. | 257/22 |
| 5,059,475 | 10/1991 | Sun et al. | 428/195 |
| 5,064,775 | 11/1991 | Chang | 438/163 |
| 5,238,877 | 8/1993 | Russell | 437/231 |
| 5,263,111 | 11/1993 | Nurse et al. | 385/130 |
| 5,274,246 | 12/1993 | Hopkins et al. | 257/17 |

(List continued on next page.)

OTHER PUBLICATIONS

Jones, Jr. et al., *Electrical, Thermoelectric, And Optical Properties Of Strongly Degenerate Polycrystalline Silicon Films*, J. Appl. Phys., vol. 56, No. 6, Sep. 15, 1984, pp. 1701–1706.

Seager et al., *Dangling Bonds And The Urbach Tail In Silicon$^{a)}$*, J. Appl. Phys., vol. 58, No. 7, Oct. 1, 1985, pp. 2704–2708.

Jackson et al., *Direct Measurement Of Gap–State Absorption In Hydrogenated Amorphous Silicon By Photothermal Deflection Spectroscopy*, Physical Review B, vol. 25, No. 8, Apr. 15, 1982, pp. 5559–5562.

(List continued on next page.)

*Primary Examiner*—Akm E. Ullah
*Attorney, Agent, or Firm*—Myers Bigel SIbley & Sajovec

[57] ABSTRACT

Methods of forming polycrystalline semiconductor waveguides include the steps of forming a first cladding layer (e.g., $SiO_2$) on a substrate (e.g., silicon) and then forming a polycrystalline semiconductor layer (e.g., poly-Si) on the first cladding layer using a direct deposition technique or by annealing amorphous silicon (a-Si) to form a polycrystalline layer, for example. The deposited polycrystalline semiconductor layer can then be polished at a face thereof to have a root-mean-square (RMS) surface roughness of less than about 6 nm so that waveguides patterned therefrom have loss ratings of better than 35 dB/cm. The polished polycrystalline semiconductor layer is then preferably etched in a plasma to form a plurality of polycrystalline strips. A second cladding layer is then formed on the polycrystalline strips to form a plurality of polycrystalline waveguides which provide relatively low-loss paths for optical communication between one or more optoelectronic devices coupled thereto. The annealed amorphous silicon layer or deposited polycrystalline layer can also be hydrogenated by exposing the second cladding layer to a hydrogen containing plasma at a temperature and pressure of about 350° C. and 0.16 mTorr, respectively, and for a duration in a range between about 30 and 60 minutes. This further improves the loss ratings of the waveguides to about 15 dB/cm or less.

4 Claims, 3 Drawing Sheets

U.S. PATENT DOCUMENTS

| | | | |
|---|---|---|---|
| 5,279,686 | 1/1994 | Nishida | 438/71 |
| 5,303,319 | 4/1994 | Ford et al. | 385/131 |
| 5,394,490 | 2/1995 | Kato et al. | 385/14 |
| 5,508,555 | 4/1996 | Brotherton et al. | 257/650 |
| 5,528,053 | 6/1996 | Schwaklke | 438/156 |
| 5,681,402 | 10/1997 | Ichinose et al. | 257/459 |
| 5,841,931 | 11/1998 | Foresi et al. | 385/131 |

OTHER PUBLICATIONS

Jackson et al., *Density Of Gap States Of Silicon Grain Boundaries Determined By Optical Absorption*, Appl. Phys. Lett., vol. 43, No. 2, Jul. 15, 1983, pp. 195–197.

Emmons et al., *Buried–Oxide Silicon–on–Insulator Structures I: Optical Waveguide Characteristics*, IEEE Journal of Quantum Electronics, vol. 28, No. 1, Jan. 1992, pp. 157–163.

Weiss et al., *The Transmission Properties Of Optical Waveguides In SIMOX Structures*, Optical and Quantum Electronics, vol. 23, 1991, pp. 1061–1065.

Soref et al., *All–Silicon Active and Passive Guided–Wave Components For $\lambda 1=1.3$ and $1.6\mu m$*, IEEE Journal of Quantum Electronics, vol. QE–22, No. 6, Jun. 1986, pp. 873–879.

Asakawa et al., *Three–Dimensional Optical Interconnects By Stacked Arrow Waveguides*, Electronics Letters, vol. 29, Jun. 29, 1993, pp. 1485–1486.

Soref et al., *Vertically Integrated Silicon–on–Insulator Waveguides*, IEEE Photonics Technology Letters, vol. 3, No. 1, Jan. 1991, pp. 22–24.

Rickman et al., *Low–Loss Planar Optical Waveguides Fabricated In SIMOX Material*, IEEE Photonics Technology Letters, vol. 4, No. 6, Jun. 1992, pp. 633–635.

Zhao et al., *Silicon On Insulator Mach–Zehnder Waveguide Interferometers Operating At $1.3 \mu m$*, Appl. Phys. Lett., vol. 67, No. 17, Oct. 23, 1995, pp. 2448–2449.

Adar et al., *Measurement Of Very Low–Loss Silica On Silicon Waveguides With A Ring Resonator*, Appl. Phys. Lett., vol. 58, No. 5, Feb. 4, 1991, pp. 444–445.

Weiss et al., *Optical Waveguides In SIMOX Structures*, IEEE Photonics Technology Letters, Vol. 3, No. 1, Jan. 1991, pp. 19–21.

Hunsperger, Springer Series in Optical Sciences, Intergrated Optics: Theory and Technology, Second Edition, pp. 1–44.

Wu et al., *Photodector Arrays In Laser–Recrystallized Silicon Integrated With An Optical Waveguide*, Mat. Res. Soc. Symp. Proc., vol. 35, 1985 Materials Research Society, pp. 675–680.

Hilleringmann et al., *Optoelectronic System Integration On Silicon: Waveguides, Photodectors, And VLSI CMOS Circuits On One Chip*, IEEE Transactions On Electron Devices, vol. 42, No. 5, May 1995, pp. 841–846.

Kurdi et al., *Optical Waveguides In Oxygen–Implanted Buried–Oxide Silicon–On–Insulator Structures*, Optics Letters, vol. 13, No. 2, Feb. 1988, pp. 175–177.

Kokubun et al., *Low–Loss Antiresonant Reflecting Optical Waveguide On Si Substrate In Visible–Wavelength Region*, Electronics Letters, vol. 22, Jun. 30, 1986, pp. 892–893.

Schmidtchen et al., *Low Loss Singlemode Optical Waveguides With Large Cross–Section In Silicon–On–Insulator*, Electronics Letters, vol. 27, Jun. 12, 1991, pp. 1486–1487.

Lim, *Simulation Of Single Mode Si Waveguides And Electro–Optic Coupling Modulators*, Bachelor of Science in Electrical Science & Engineering at the Massachusetts Institute of Technology, May 1994, pp. 5–90.

Foresi et al., *Losses In Polycrystalline Silicon Waveguides*, Appl. Phys. Lett., vol. 68, No. 15, Apr. 8, 1996, pp. 2052–2054.

P.K. Tien, *Light Waves In Thin Films And Intergrated Optics*, Applied Optics, vol. 10, No. 11, Nov. 1971, pp. 2395–2413.

OPTOELECTRONIC INTEGRATED CIRCUITS FORMED OF POLYCRYSTALLINE SEMICONDUCTOR WAVEGUIDE

FIELD OF THE INVENTION

The present invention relates to semiconductor devices and fabrication methods, and more particularly to optoelectronic semiconductor devices and fabrication methods.

BACKGROUND OF THE INVENTION

The ability of silicon-based microelectronic integrated circuits to achieve higher data rates while simultaneously maintaining low power consumption requirements may be limited by conventional electronic interconnection technologies. To address this and other limitations associated with conventional electronic interconnection technologies, attempts have been made develop integrated optical interconnects because they offer the possibility of lower power-consumption requirements, lower data skew and higher bandwidths.

In particular, attempts have been made to provide integrated optical interconnects using monocrystalline silicon as a waveguide material. For example, in an article by R. A. Soref et al. entitled *All-Silicon Active and Passive Guided-Wave Components for λ=1.3 and 1.6 μm*, IEEE Journal of Quantum Elec., Vol. QE-22, No. 6, pp. 873–879, June (1986), end-coupled planar and channel optical waveguides were demonstrated using monocrystalline silicon layers on heavily doped silicon substrates. In addition, articles by B. L. Weiss et al. entitled *Optical Waveguides in SIMOX Structures*, IEEE Photonics Tech. Lett., Vol. 3, No. 1, pp. 19–21, January (1991); A. Rickman et al. entitled *Low-Loss Planar Optical Waveguides Fabricated in SIMOX Material*, IEEE Photonic Tech. Lett., Vol. 4, No. 6, pp. 633–635, June (1992); and U.S. Pat. No. 4,789,642 to Lorenzo et al. entitled *Method for Fabricating Low Loss Crystalline Silicon Waveguides By Dielectric Implantation*, disclose planar optical waveguides formed on silicon-on-insulator (SOI) substrates using separation by implantation of oxygen (SIMOX) fabrication techniques. However, SOI waveguide technologies typically limit the formation of all optical interconnects to the same level as the integrated electronic devices and therefore limit the "real estate" available for the electronic devices. SOI-based technologies also generally use relatively complicated regrowth techniques for the integration of optical emitters and detectors which are used with optical interconnects.

Other waveguide technologies include: ARROW (antiresonant reflector optical waveguide), as described in an article by Y. Kokubun et al. entitled *Low-Loss Antiresonant Reflecting Optical Waveguide on Si Substrate in Visible-Wavelength Region*, Electron. Lett. Vol 22, pp. 892–893 (1986); and glass waveguides on silicon substrates, as described in an article by R. Adar et al. entitled *Measurement of Very Low-Loss Silica on Silicon Waveguides With a Ring Resonator*, Appl. Phys. Lett., Vol. 58, No. 5, pp. 444–445, February (1991). However, these waveguides technologies are typically complex and may require the use of waveguides having large cross-sectional dimensions to compensate for small index of refraction ratios, as will be understood by those skilled in the art.

Waveguide technologies based on polycrystalline silicon have also been briefly considered but rejected even though (i) multiple layers of polycrystalline silicon can be easily fabricated without requiring complicated regrowth techniques to achieve high integration levels, and (ii) small waveguide dimensions can be obtained because of the large index of refraction ratio (3.5/1.5 for polycrystalline silicon on silicon dioxide $SiO_2$). This is because polycrystalline silicon typically absorbs heavily at wavelengths used for optical communication (i.e., $\lambda$=1.3–1.55 μm). These high absorption levels in polycrystalline silicon have been attributed to loss parasitics such as optical scattering which can be caused by surface imperfections and grain boundaries which are inherent in polycrystalline silicon. For example, the published absorption measurements in polycrystalline silicon are near 1000 dB/cm at optical communication wavelengths, as described in articles by W. B. Jackson et al. entitled *Density of Gap States of Silicon Grain Boundaries Determined by Optical Absorption*, Appl. Phys. Lett., Vol. 43, No. 2, pp. 195–197, July (1983); and R. E. Jones et al. entitled *Electrical, Thermoelectric, and Optical Properties of Strongly Degenerate Polycrystalline Silicon Films*, J. Appl. Phys., Vol. 56, No. 6, pp. 1701–1706, September (1984).

Thus, notwithstanding the above-described attempts to develop optical waveguides for optoelectronic integrated circuit applications, there continues to be a need for improved methods of forming optical waveguides which provide for relatively low-loss interconnects and are compatible with conventional processing techniques.

SUMMARY OF THE INVENTION

It is therefore an object of the present invention to provide improved methods of forming optoelectronic integrated circuits and circuits formed thereby.

It is another object of the present invention to provide methods of forming optoelectronic integrated circuits which are compatible with conventional processing techniques.

It is still another object of the present invention to provide methods of forming optoelectronic integrated circuits having high integration densities and circuits formed thereby.

It is yet another object of the present invention to provide methods of forming high speed and high bandwidth optoelectronic integrated circuits and circuits formed thereby.

These and other objects, features and advantages of the present invention are provided by methods of forming optoelectronic integrated circuits containing electronic and optoelectronic devices therein and electronic and optical waveguide interconnects comprised of polycrystalline semiconductors. According to one embodiment of the present invention, methods of forming an optical waveguide for an optoelectronic circuit are provided which comprise the steps of forming a first cladding layer (e.g., $SiO_2$) on a substrate (e.g., silicon) and then forming a polycrystalline semiconductor layer (e.g., poly-Si) on the first cladding layer using a direct deposition technique or by annealing amorphous silicon (a-Si) to form a polycrystalline layer, for example. The deposited polycrystalline semiconductor layer is then polished at a face thereof to have a root-mean-square (RMS) surface roughness of less than about 6 nm so that subsequently formed waveguides patterned therefrom have loss ratings of better than 35 dB/cm. The polycrystalline layer can also be subjected to a hydrogen containing plasma at a temperature and pressure of about 350° C. and 0.16 mTorr, respectively, and for a duration in a range between about 30 and 60 minutes, to further improve the loss ratings of the waveguides to about 15 dB/cm.

The polished polycrystalline semiconductor layer is then preferably etched in a plasma to form a plurality of polycrystalline strips. A second cladding layer is then formed on the polycrystalline strips to form a plurality of polycrystalline waveguides which provide relatively low-loss paths for optical communication between one or more optoelectronic devices coupled thereto. Multiple layers of polycrystalline waveguides can also be formed to provide a three-dimensional network of optical interconnects.

DESCRIPTION OF PREFERRED EMBODIMENTS

Figure 1A:
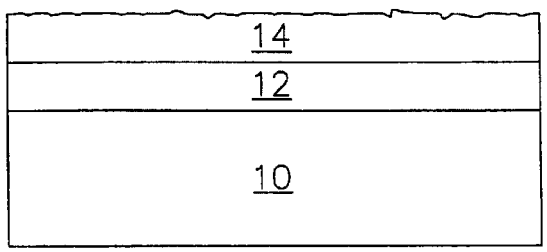
FIGS. 1A–1C illustrate schematic cross-sectional views of intermediate structures which describe methods of forming semiconductor waveguides according to a first embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 1B:
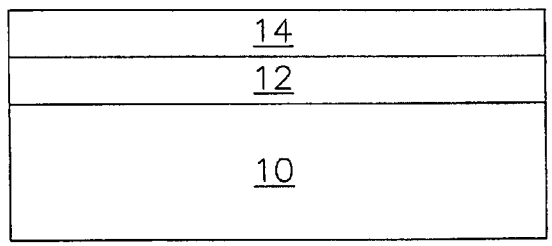
Figure 1C:
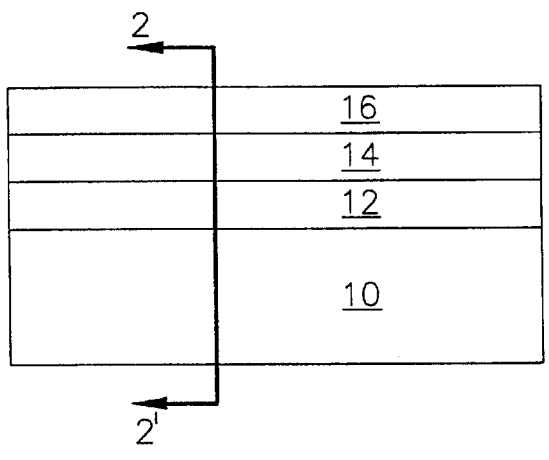

Referring to FIGS. 1A–1C, a method of forming a polycrystalline semiconductor waveguide according to a first embodiment of the present invention will now be described. In particular, the method includes a step of forming a first cladding layer 12 on a face of a substrate 10. Here, the first cladding layer 12 may comprise a layer of silicon dioxide ($SiO_2$) or silicon nitride ($Si_3N_4$) on a monocrystalline silicon substrate 10 of predetermined conductivity type. After formation of the first cladding layer 12, a layer 14 of polycrystalline semiconductor such as polycrystalline silicon (poly-Si) is formed on the first cladding layer 12. The layer 14 of polycrystalline semiconductor may be formed using a direct deposition technique or by annealing a deposited layer of amorphous semiconductor such as amorphous silicon (a-Si), as explained more fully hereinbelow, or by other conventional techniques. According to preferred methods, the layer 14 of poly-Si may be deposited directly at a temperature in a range between 625° C. and 700° C. or formed by depositing amorphous silicon at temperature in a range between 475° C. and 600° C. and then annealing the deposited amorphous silicon at a temperature of about 600° C. Preferably, the layer 14 of polycrystalline semiconductor is formed to contain grains smaller than 0.4 $\mu$m.

Referring now to FIG. 1B, the layer 14 of polycrystalline semiconductor is then preferably polished, if necessary, to have a rootmean-square (RMS) surface roughness of less than about 6 nanometers. In particular, a polishing step using chemical-mechanical polishing (CMP) is typically necessary if the layer 14 of polycrystalline semiconductor is deposited but may not be necessary if the layer 14 is formed by annealing an amorphous semiconductor layer since such an annealed layer may already have an RMS surface roughness below 6 nm. As best illustrated by FIG. 1C, a second cladding layer 16 is then formed on a smooth upper face of the polycrystalline semiconductor layer 14. The second cladding layer 16 may also comprise silicon dioxide ($SiO_2$), silicon nitride ($Si_3N_4$) or similar electrically insulating layer preferably having an index of refraction less than about 0.7 times an index of refraction of the polycrystalline semiconductor layer 14. Such a relatively low index of refraction is preferred so that the index of refraction ratio between the semiconductor layer 14 and the second cladding layer 16 is sufficient large to provide adequate confinement of optical signals propagating in the polycrystalline semiconductor layer 14.

Figure 2:
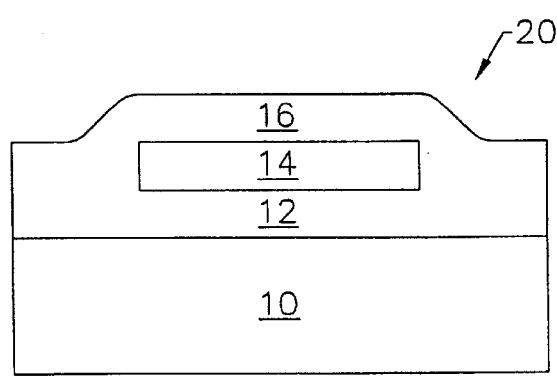
FIG. 2 illustrates a schematic cross-sectional view of a semiconductor waveguide according to an embodiment of the present invention.

As illustrated best by FIG. 2, a polycrystalline silicon waveguide 20 may be patterned in the shape of a strip. Here, FIG. 2 illustrates an exemplary cross-section of FIG. 1C taken along the line 2–2'. The poly-Si layer 14 may be patterned as a strip by etching the deposited or annealed layer 14 of FIG. 1B in a plasma containing $SF_6$, HBr or $CF_4$, or combinations thereof, for example. To improve the waveguide loss levels to about 15 dB/cm, as described more fully hereinbelow, the poly-Si layer 14 is preferably exposed in a electron-cyclotron resonance (ECR) plasma chamber to a hydrogen containing plasma at a temperature and pressure of about 350° C. and 0.16 mTorr, respectively, for a duration in a range between about 30 and 60 minutes. Preferably, the poly-Si layer 14 is exposed to the hydrogen containing plasma after formation of the second cladding layer 16 thereon in order to prevent out-diffusion of hydrogen atoms from the surface of the poly-Si layer 14. However, as determined by the inventors herein, this preferred hydrogenation step may not be necessary to achieve the low loss levels if the poly-Si layer 14 is formed by annealing amorphous silicon (a-Si) at a temperature of about 1100° C., but such high temperature annealing steps may not be compatible with steps to simultaneously form electronic and optoelectronic devices (e.g., emitters, detectors, etc.) in the substrate 10 using conventional device processing techniques.

Figure 3:
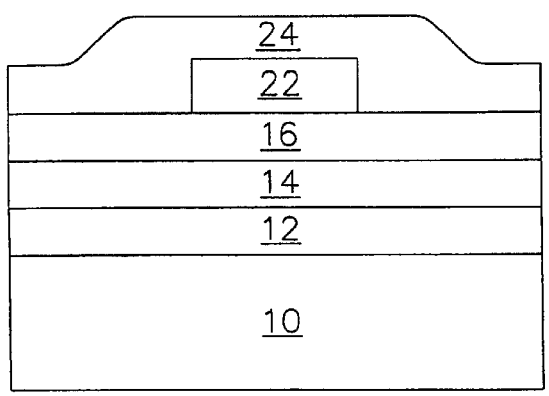
FIG. 3 illustrates a schematic cross-sectional view of a multilayered waveguide structure according to an embodiment of the present invention.
Figure 4:
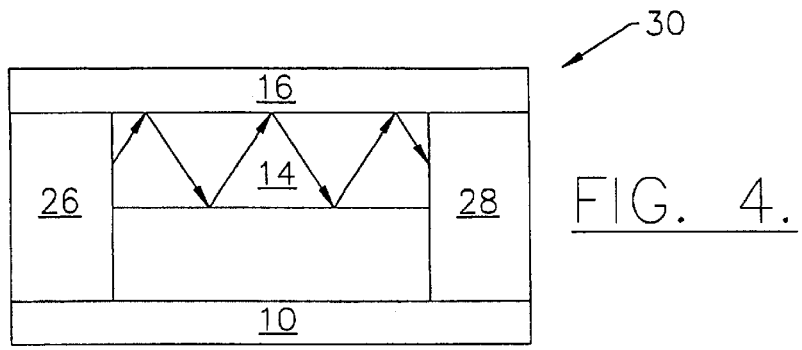
FIG. 4 illustrates a schematic cross-sectional view of an optoelectronic integrated circuit according to an embodiment of the present invention.

As illustrated best by FIG. 3, the second cladding layer 16 may also be utilized as an underlying cladding layer for another polycrystalline semiconductor waveguide 22 formed thereon using steps similar to the above described steps for forming the polycrystalline semiconductor layer 14. For example, a multilayered waveguide structure may be formed by patterning an upper level waveguide 22 and cladding layer 24 on the second cladding layer 16. Moreover, as illustrated best by FIG. 4, an optoelectronic integrated circuit 30 may also be provided by forming an optical emitter 26 and optical detector 28 at first and second ends of a polycrystalline semiconductor strip waveguide 14, using conventional processing techniques.

The present invention will now be more fully described with specific examples of preferred processing techniques and results obtained therefrom. For example, a comparison study was performed by the inventors herein to assess optical loss levels in poly-Si strip waveguides having the cross-section illustrated by FIG. 2. Here, strip waveguides were formed using deposited poly-Si layers, annealed amorphous-Si layers and BESOI (bond and etchback silicon on insulator) substrates. All of the waveguides tested had a thickness of 1 μm, a width of 8 μm and used silicon dioxide (SiO$_2$) as a cladding material. The fabrication sequence for the poly-Si waveguides consisted of LPCVD deposition of 3 μm of SiO$_2$ on a silicon substrate, followed by LPCVD deposition of 1 μm of core (poly-Si at 625° C. or amorphous-Si at 560 or 580° C.). Chemical mechanical polishing (CMP) was also performed on several of the 625° C. samples to reduce the roughness of the poly-Si waveguide surface. Samples (including BESOI) were then plasma etched in SF$_6$ to transfer the strip pattern, and clad with an upper layer of SiO$_2$ approximately 1 μm thick. Finally, the amorphous-Si samples were annealed at 600° C. for 16 hours to transform the amorphous-Si samples into poly-Si. Each sample included twenty 8 μm-wide waveguides. These waveguides were multimode, however, the results obtained concerning their performance is applicable to single-mode waveguides as well. Reducing the waveguide dimensions may, however, change the interaction of the guided mode with the waveguide surfaces. The optical mode of smaller waveguides extends further from the core and the light intensity at the waveguide surface is greater. The increased light intensity at the waveguide surfaces increases the amount of light lost because of surface imperfections.

As will be understood by those skilled in the art, an important step in waveguide preparation is facet production. Silicon, unlike GaAs, is not easily cleaved. Although (100) Si can typically be cleaved by thinning silicon substrates to 90 μm before cleaving, the results herein were achieved using unthinned (100) silicon substrates. Instead, a polishing technique that produces excellent facets with high yield was performed. The polishing technique follows TEM sample preparation using a tripod polisher. Using this polishing technique to form facets, standard deviations in measured output power of only 3% were achieved in measurements of 20 waveguides having the same width. To perform cutback measurements, waveguides of different lengths were prepared and the transmission of λ=1.55 μm light through the waveguides was measured. Here, an optical emitter source (e.g., laser diode) was coupled into an optical fiber to inject light into the sample waveguides. A conically tipped optical fiber mounted on a piezoelectrically controlled 3-axis translation stage was butt coupled into each waveguide under test. Each waveguide was also mounted on an x-ray goniometer and 3-axis translation stage, allowing control of six degrees of freedom. Using two CCD cameras and an optical power meter, images of the light scattered from the surface of the waveguide, images of the light exiting the output facets of the waveguides, and measurements of the power out of the waveguides were obtained.

Figure 5:
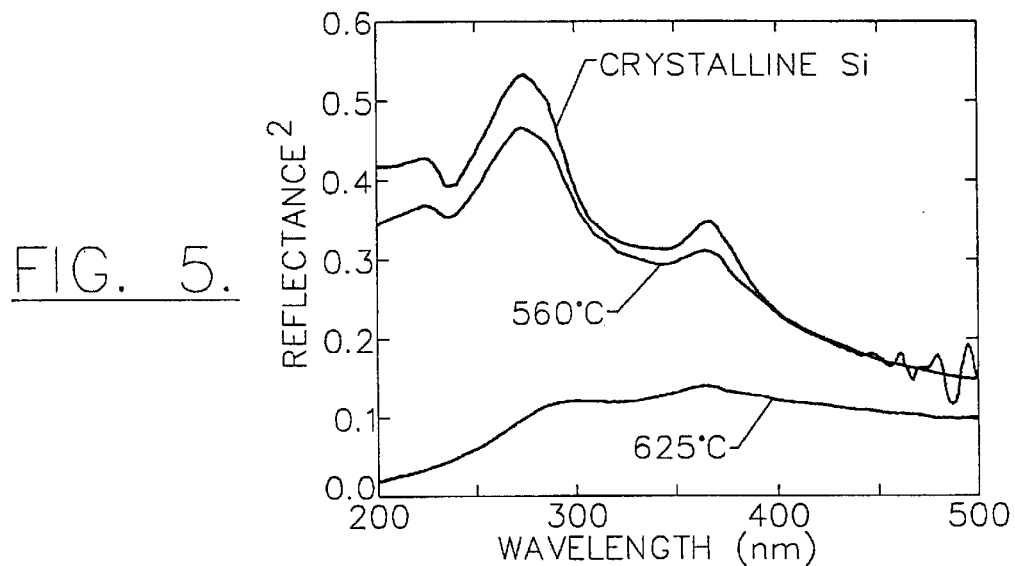
FIG. 5 is a graph illustrating spectral reflectance data versus wavelength of incident light.

The 625° C. poly-Si waveguides exhibit losses of about 77 dB/cm; the 560° C. annealed amorphous-Si waveguides and polished 625° C. poly-Si waveguides exhibited noticeably lower losses of about 35 dB/cm; and the BESOI waveguides had losses of less than 1 dB/cm. The loss measurements are summarized in Table 1 below. Images of the surfaces of the poly-Si waveguides during testing showed some light scattering at the surfaces of the waveguide. To quantitatively assess the magnitude of the surface roughness, we used spectral reflectance (SR) and atomic force microscopy (AFM) measurements. Spectral reflectance is related to the RMS surface roughness by the following equation:

$$R/R_0 = \exp{-[4\pi\cos\phi(\sigma/\lambda)]^2} \quad (1)$$

where R is the measured reflectance, R$_0$ is the reflectance of a baseline sample (a Si wafer in this case), φ is the angle of incidence of the measured beam, σ is the RMS surface roughness and λ is the wavelength of the incident beam. This relation holds under the condition that the RMS surface roughness is much smaller than the wavelength of the incident light. FIG. 5 shows the square of the reflectance of crystalline Si, unpolished 625° C. poly-Si, and 560° C. annealed amorphous-Si plotted against the wavelength of the incident illumination. The 560° C. samples exhibited a spectrum similar to that of the monocrystalline silicon samples, indicating a smooth surface, while the reflectance of the 625° C. poly-Si samples are reduced because of greater surface roughness. The SR data provided RMS surface roughness values of 4.5 nm and 19.5 nm for the 560° C. and unpolished 625° C. samples, respectively. Direct AFM measurement of the surface roughness gives values of 3.5 nm for the 560° C. samples and 20.1 nm for the unpolished 625° C. samples. These values agree well with the SR measurements. AFM roughness data for all of the samples are also provided by Table 1.

TABLE 1

| Sample | RMS roughness (nm) | Grain Size (μm) | Measured loss (dB/cm) | Calculated Loss (dB/cm) | Bulk Loss (dB/cm) |
| --- | --- | --- | --- | --- | --- |
| BESOI | — | — | 1.0 | — | — |
| 560° C. | 3.7 | 0.40 | 37.0 | 1.5 | 35.5 |
| 560° C. + ECR | 3.7 | 0.40 | 15 | 1.5 | 13.5 |
| 580° C. | 14.9 | .25 | 71.0 | 24.0 | 47 |
| 625° C. | 20.1 | 0.18 | 77.0 | 43.6 | 33.4 |
| 625° C. CMP | 6.8 | 0.18 | 35.0 | 5.0 | 30 |
| 625° C. CMP + ECR | 6.8 | 0.18 | 16 | 5.0 | 11.0 |

To determine the relative contribution of loss from the surface roughness, an analysis developed by P. K. Tien in an article entitled *Light Waves in Thin Films and Integrated Optics*, Applied Optics, Vol. 10, No. 11, pp. 2395–2413, November (1971), was used. From a knowledge of the modal characteristics of the waveguide, Tien's analysis gives an expression for the loss due to scattering at the waveguide surface:

$$\alpha = A^2 \left( \frac{1}{2} \frac{\cos^3\theta}{\sin\theta} \right) \left( \frac{1}{t_g + (1/q) + (1/p)} \right) \quad (2)$$

In this expression, θ is the angle of the rays propagating in the waveguide, 1/p and 1/q are the penetration depths of the mode into the cladding (in our symmetric case p=q), t$_g$ is the guide thickness, and A is a measure of the surface roughness. The relation for A is given by, $$A = \frac{4\pi}{\lambda_2}(\sigma_{12}^2 + \sigma_{23}^2)^{1/2} \quad (3)$$

where σ$_{12}$ and σ$_{23}$ are the RMS surface roughness of the polySi/SiO$_2$ interfaces at the top and bottom of the waveguide, respectively, and λ$_2$ is the wavelength in the core material.

Figure 6:
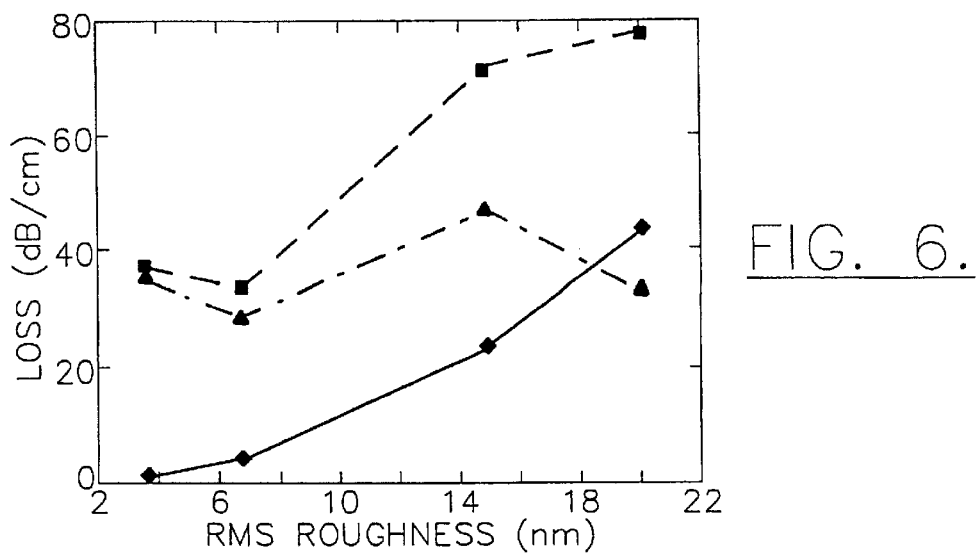
FIG. 6 is a graph illustrating measured, calculated and estimated loss versus RMS surface roughness.
Figure 7:
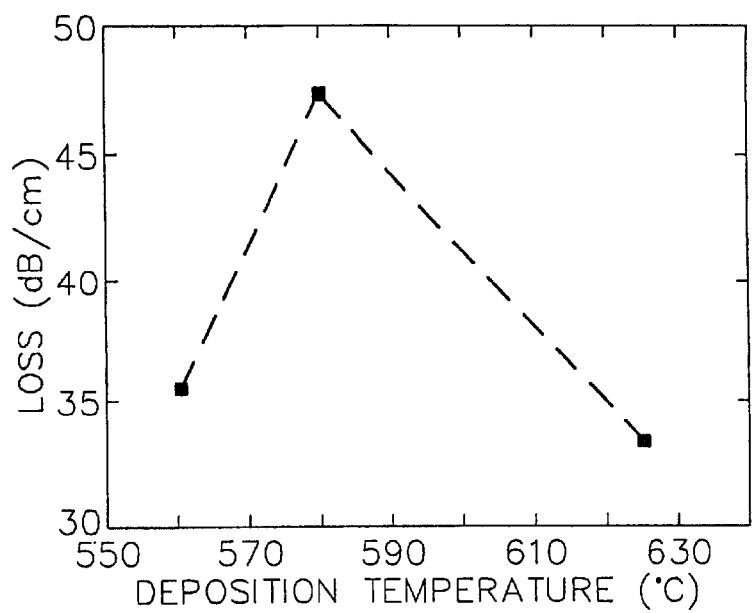
FIG. 7 is a graph illustrating estimated bulk loss versus deposition temperature.

Simplifying assumptions were used to estimate the contributions of scattering. First, only slab waveguides (edge roughness is neglected) were considered. Second, the roughness of the lower interface between the poly-Si and SiO$_2$ was assumed to be negligible. Third, only the power in the fundamental mode was measured. The third assumption is based on the high loss of higher order modes, which makes their contribution to the total output power negligible. Analytic considerations also showed that only the fundamental mode can be coupled out of the polySi/SiO$_2$ structure. Using the AFM surface roughness values, scattering losses were estimated at 43.6 and 5.0 dB/cm for the 625° C. and 625° C. CMP samples, respectively. The calculated results are also summarized in Table 1. Surface scattering cannot account for all measured loss. However, surface scattering does account for the difference in measured loss for the 625° C. and 625° C. CMP waveguides. The measured difference is 42.0 dB/cm and the calculated difference is 38.6 dB/cm. The larger measured difference may be due to edge roughness, which will be worse for samples with rough surfaces due to photolithographic pattern transfer of the surface roughness to the waveguides sidewalls. The agreement between the measured and calculated values shows that surface roughness is a dominant source of loss in poly-Si waveguides. To determine the bulk microstructure contributions to the total loss, it is necessary to remove surface scattering loss from the total measured loss. FIG. 6 shows the measured losses (squares) and the calculated losses (diamonds) as a function of surface roughness. Subtracting the calculated scattering loss from the total loss gives an estimate (triangles) of the bulk loss for each sample. FIG. 7 also shows the dependence of the estimated bulk losses on the deposition temperature. The polished 625° C. samples exhibit the lowest loss. The bulk loss of the 580° C. samples is markedly higher, while the 560° C. sample shows losses similar to the polished 625° C. sample. By controlling the grain size through the deposition temperature, one can optimize the performance of poly-Si as a lightguiding material.

As described above, the measured losses in poly-Si waveguides were found to be two orders of magnitude lower than the published absorption data for poly-Si. Control of the surface roughness is believed by the inventors to be critical to achieving low loss levels. Poly-Si deposited at 625° C. and polished by CMP exhibits losses of 35 dB/cm compared to losses of 77 dB/cm measured for unpolished 625° C. poly-Si. The reduction in loss correlated well with calculated losses by surface scattering. Estimates of bulk losses for the poly-Si waveguides show a dependence of the loss on the film deposition temperature.

Finally, to improve the waveguide loss levels to about 15 dB/cm, the poly-Si waveguide material is preferably exposed to a hydrogen containing plasma at a temperature and pressure of about 350° C. and 0.16 mTorr, respectively, for a duration in a range between about 30 and 60 minutes. This step may be performed in a 600-Watt electron-cyclotron resonance (ECR) plasma chamber. In particular, the poly-Si waveguide material is exposed to the hydrogen containing plasma after formation of a cladding layer thereon, to prevent out-diffusion of hydrogen atoms from the surface of the poly-Si waveguide. As illustrated by Table 1, the measured losses improve significantly to 15–16 dB/cm for the 560° C. and polished 625° C. samples, when the samples are exposed to the hydrogen plasma in the ECR chamber.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An optoelectronic integrated circuit, comprising:
   a semiconductor substrate;
   a polycrystalline semiconductor waveguide having a surface thereon with a root-mean-square surface roughness of less than about 6 nm, on said semiconductor substrate;
   a cladding layer having an index of refraction less than about 0.7 times an index of refraction of said polycrystalline semiconductor waveguide, surrounding at least a portion of said polycrystalline semiconductor waveguide; and
   a source of optical energy on said semiconductor substrate, coupled to an interior of said polycrystalline semiconductor waveguide to propagate a signal having a first wavelength of less than about 1.55 microns therein.

2. The optoelectronic integrated circuit of claim 1, wherein said polycrystalline semiconductor waveguide comprises a hydrogenated layer of polycrystalline silicon; and wherein said cladding layer comprises silicon dioxide.

3. The optoelectronic integrated circuit of claim 1, wherein said polycrystalline semiconductor waveguide contains grains therein smaller than 0.4 microns.

4. The optoelectronic integrated circuit of claim 2, wherein said polycrystalline semiconductor waveguide contains grains therein smaller than 0.4 microns.

* * * * *

UNITED STATES PATENT AND TRADEMARK OFFICE
CERTIFICATE OF CORRECTION

PATENT : 6,108,464
DATED : August 22, 2000
INVENTOR(S) : Foresi et al.

It is certified that error appears in the above-identified patent and that said Letters Patent is hereby corrected as shown below:

On the title page, items [54] (and in col. 1, line 1) and [62] should read as follows:
--[54] Please delete "OPTOELECTRONIC INTEGRATED CIRCUITS FORMED OF POLYCRYSTALLINE SEMICONDUCTOR WAVE-GUIDE" and substitute --OPTOELECTRONIC INTEGRATED CIRCUITS HAVING POLYCRYSTALLINE SILICON WAVEGUIDED THERIN-- therefore.

[62] Please add the following: Division of application No. 08/756,812, Nov. 26, 1996, Pat. No. 5,841,931.--.

At column 1, line 5, please insert the following:
--This invention was made with government support under Grant Number F49620-93-1-0481 awarded by the Air Force and Grant Number DMR-9400334 awarded by the National Science Foundation. The government has certain rights in the invention.--.

Signed and Sealed this

Twenty-ninth Day of May, 2001

*Attest:*

NICHOLAS P. GODICI

*Attesting Officer*  *Acting Director of the United States Patent and Trademark Office*